(12) United States Patent
Khait

(10) Patent No.: US 12,538,913 B2
(45) Date of Patent: Feb. 3, 2026

(54) SYSTEM FOR SELECTIVE SPRAYING

(71) Applicant: Centure Applications LTD, Tel-Aviv (IL)

(72) Inventor: Itzhak Khait, Kibutz Ein Zivan (IL)

(73) Assignee: Centure Applications LTD, Tel Aviv-Jaffa (IL)

( * ) Notice: Subject to any disclaimer, the term of this patent is extended or adjusted under 35 U.S.C. 154(b) by 273 days.

(21) Appl. No.: 18/546,455

(22) PCT Filed: Feb. 14, 2022

(86) PCT No.: PCT/IL2022/050174
§ 371 (c)(1),
(2) Date: Aug. 15, 2023

(87) PCT Pub. No.: WO2022/172274
PCT Pub. Date: Aug. 18, 2022

(65) Prior Publication Data
US 2024/0122171 A1   Apr. 18, 2024

Related U.S. Application Data

(60) Provisional application No. 63/149,378, filed on Feb. 15, 2021.

(51) Int. Cl.
*A01M 7/00* (2006.01)
*A01C 21/00* (2006.01)
(Continued)

(52) U.S. Cl.
CPC ........... *A01M 7/006* (2013.01); *A01C 21/005* (2013.01); *A01C 23/047* (2013.01);
(Continued)

(58) Field of Classification Search
CPC .. A01M 7/006; A01M 7/0089; A01M 21/043; A01C 21/005; A01C 23/047; B05B 1/16; B05B 12/122
(Continued)

(56) References Cited

U.S. PATENT DOCUMENTS 9,148,995 B2 * 10/2015 Hrnicek ............... A01C 23/008
10,255,670 B1    4/2019 Wu et al.
(Continued)

FOREIGN PATENT DOCUMENTS

CN     108684644 A    10/2018
GB     2551345 A      12/2017
(Continued)

OTHER PUBLICATIONS

ISA/US, International Search Report and the Written Opinion of the International Searching Authority in re Int'l App. No. PCT/IL2021/051133 (Dec. 22, 2021).
(Continued)

*Primary Examiner* — Steven J Ganey
(74) *Attorney, Agent, or Firm* — Intrinsic Law Corp.

(57) ABSTRACT

A system for spot or band spraying of a treatment applied to target areas includes nozzle units that are connected to a liquid conducting member and spaced at horizontal intervals. Each nozzle unit includes first and second nozzles configured to spray droplets around opposing spraying vectors. For each target area, a spraying vector of a first nozzle of a first nozzle unit crosses a spraying vector of a second nozzle of an adjacent second nozzle unit. When a boom is at an operation height, each location within a target area receives a predefined cumulative volume of treatment, and spray patterns of the first and second nozzles of adjacent nozzle units overlap by at least 10%. When the boom is within 5% deviation from the predetermined operation (Continued)

height, each location within the target area receives a predefined minimum percentage of the predefined cumulative value of the treatment.

24 Claims, 7 Drawing Sheets

(51) Int. Cl.
    *A01C 23/04*     (2006.01)
    *A01M 21/04*     (2006.01)
    *B05B 1/16*     (2006.01)
    *B05B 12/12*     (2006.01)

(52) U.S. Cl.
    CPC ........ *A01M 7/0089* (2013.01); *A01M 21/043* (2013.01); *B05B 1/16* (2013.01); *B05B 12/122* (2013.01)

(58) Field of Classification Search
    USPC ......... 239/69, 159, 161, 163, 166, 170, 172, 239/550, 551, 562, 413
    See application file for complete search history.

(56) References Cited

U.S. PATENT DOCUMENTS

| | | | |
|---|---|---|---|
| 11,393,049 | B2 | 7/2022 | Khait et al. |
| 11,625,794 | B2 | 4/2023 | Khait et al. |
| 2004/0195356 | A1 | 10/2004 | Ellsworth |
| 2012/0237083 | A1 | 9/2012 | Lange et al. |
| 2018/0330166 | A1 | 11/2018 | Redden et al. |
| 2019/0064363 | A1 | 2/2019 | Redden et al. |
| 2019/0124827 | A1* | 5/2019 | Davis ................... A01C 23/007 |
| 2019/0239502 | A1 | 8/2019 | Palomares et al. |
| 2020/0011019 | A1 | 1/2020 | Serrat et al. |
| 2020/0141079 | A1 | 5/2020 | Kijlstra et al. |
| 2020/0214281 | A1 | 7/2020 | Koch |
| 2020/0406281 | A1 | 12/2020 | Funseth et al. |
| 2021/0056338 | A1 | 2/2021 | Padwick et al. |
| 2021/0283637 | A1* | 9/2021 | Hendrickson .......... G05B 15/02 |
| 2021/0323015 | A1* | 10/2021 | Harmon .............. A01M 7/0042 |
| 2023/0245249 | A1 | 8/2023 | Khait et al. |

FOREIGN PATENT DOCUMENTS

| | | |
|---|---|---|
| KR | 20100034808 A | 4/2010 |
| WO | 2020049576 A2 | 3/2020 |
| WO | 2022064482 A1 | 3/2022 |

OTHER PUBLICATIONS

ISA/IL, International Search Report and the Written Opinion of the International Searching Authority in re Int'l App. No. PCT/IL2022/050174 (May 17, 2022).

R. Booker, "Technology targets spray control", WEEDit Blog (Mar. 22, 2018).

Klein et al., "Nozzles—Selection and Sizing", Cooperative Extension, Institute of Agricultural & Natural Resources at the University of Nebraska-Lincoln cooperating with the Counties and the USDA, EC141 p. 1-10, The Board of Regents of the University of Nebraska (2011).

T. Wolf, "Optical Spot Spraying and AI Scouting", Sprayers 101 (Feb. 8, 2018).

* cited by examiner

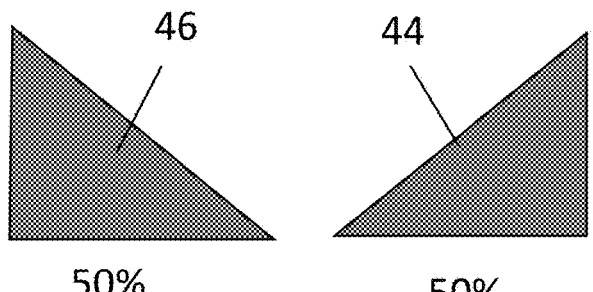
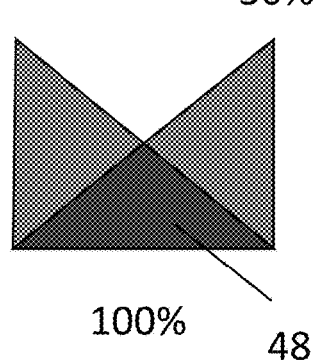
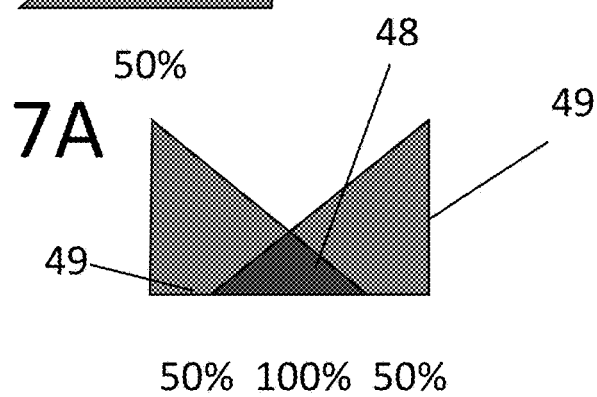
FIG. 7A
FIG. 7B
FIG. 7C
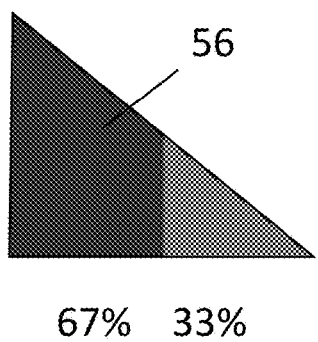
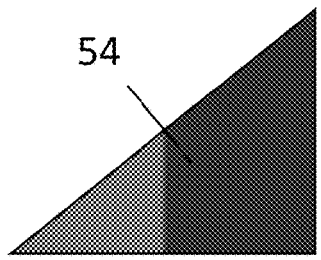
FIG. 7D
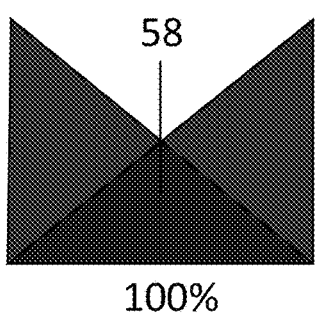
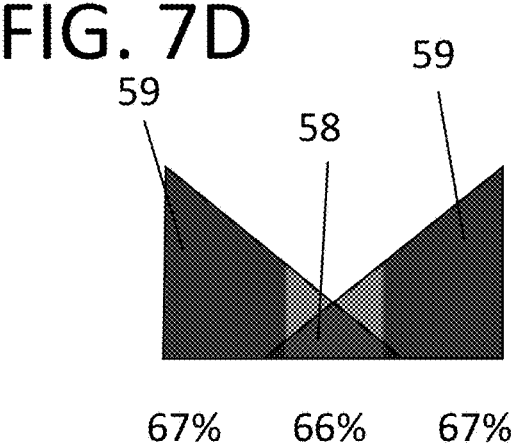
FIG. 7E
FIG. 7F FIG. 7G
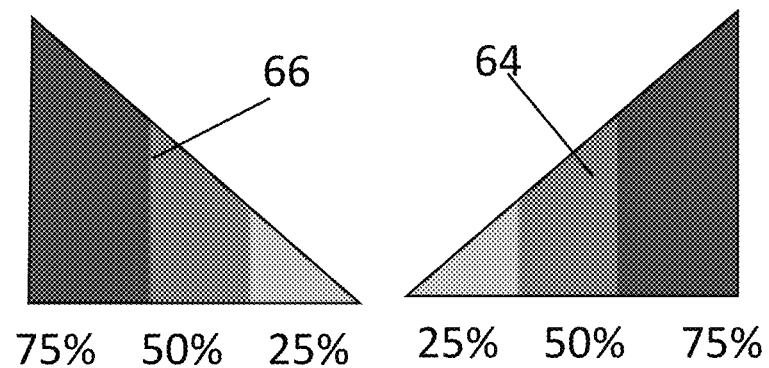
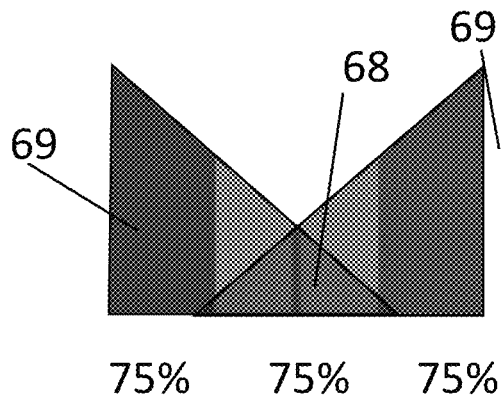
FIG. 7H
FIG. 7I

SYSTEM FOR SELECTIVE SPRAYING

RELATED APPLICATIONS

This application is a national phase entry of PCT Application No. PCT/IL2022/050174 filed on Feb. 14, 2022, which claims the benefit of priority of U.S. Patent Application Ser. No. 63/149,378 filed on Feb. 15, 2021, the contents of which are incorporated herein by reference in their entirety.

FIELD AND BACKGROUND OF THE INVENTION

The present invention, in some embodiments thereof, relates to agricultural treatment of plants, and more specifically, but not exclusively, to systems and methods for optimizing delivery of a predetermined volume of treatment onto one or more target areas when spot spraying or band spraying.

Agricultural machines are used to treat agricultural fields, for example, to apply pesticides, herbicides, and fertilizers. The treatment may be applied by a spray boom, which may be carried by agricultural machine, such a tractor or an airplane.

It is desirable to spray an appropriate volume of treatment onto each target. Underspraying of chemical treatments results in reduced efficacy. Overspraying causes unnecessary expense as well as environmental concerns.

A typical cause of underspraying is lowering of the boom below its standard operating height. Lowering (and raising) of the boom occurs inevitably as a boom is pulled across an uneven surface. When the boom is lowered, each spray fan extends to a lesser horizontal distance from the nozzle. As a result, areas between nozzles receive less, or no, treatment. To prevent underspraying, sprayers are arranged with nozzles having overlapping spray patterns. The overlap ensures that, when the boom is lowered up to a certain vertical distance, spray nevertheless reaches every location within a target area. Sprayers incorporating conventional flat-fan nozzles use 30 to 50% overlapping of adjacent spray patterns.

To limit overspraying, sprayers apply spray onto a selected area within an agricultural field, using techniques known as band spraying or spot spraying. Band spraying applies spray onto parallel bands within a field, where crops are being grown, as opposed to a broadcast application in which an entire area is treated. This means that only a portion of the field receives spray, so the total amount of chemical product applied per area is reduced. In spot spraying, a target area is identified prior to spraying. For example, a weed may be identified with an image sensor or with an infrared sensor. The sprayer may be programmed to spray herbicide only in a rectangular target area containing the weed.

SUMMARY

Existing systems for spot spraying do not incorporate nozzles with overlapping spray patterns. This is, at least in part, because the target area for the treatment is anyways narrow and defined, such that the use of multiple nozzles along the boom would be wasteful. However, in order to prevent underspraying, each nozzle is required to spray an area that is larger than the target area containing the weeds, for example, an area having 120% of the required horizontal extent. This excess spraying attenuates the benefits of spot spraying, because it is still necessary to apply more chemical treatment than is necessary. In addition, this excess spraying still does not guarantee a minimum coverage of spraying in the event of lowering the boom. If the boom is lowered below a certain height, locations at the periphery of the target area still do not receive any treatment.

It is an object of the present disclosure to provide an improved system for spot spraying and band spraying that enables precise application of the appropriate amount of treatment for the target area, when the boom is at a predetermined operation height. It is a further object of the present disclosure to provide a system that ensures that, even when the boom is lowered below the predetermined operation height, a very high percentage of the required spray is sprayed onto each location within the target area.

These objectives are achieved through use of a system in which the spray patterns from each nozzle unit of a boom are divided into two spray patterns. The two spray patterns may have an approximate cross section of a right triangle. Spray patterns from adjacent nozzle units overlap when the boom is at the predetermined operation height. Due to the orientation of the nozzles, when the boom is at the predetermined operation height, no area of the field outside the target area receives treatment. In addition, the overlap ensures that, at the predetermined operation height, each location within a target area receives exactly a predetermined cumulative volume of treatment. When the boom is lowered to below the predetermined operation height, each location within the target area receives a minimum percentage of the predetermined cumulative volume.

According to a first aspect, a system adapted for spot spraying or band spraying of a treatment applied to one or more target areas of an agricultural field is disclosed. The system includes at least one liquid conducting member. A plurality of nozzle units are connected to the at least one liquid conducting member and spaced at intervals extending on a horizontal axis. Each nozzle unit includes at least first and second nozzles configured to spray droplets around opposing spraying vectors along the horizontal axis. When the at least one liquid conducting member and plurality of nozzle units are attached to a boom, and for each target area between adjacent nozzle units, a spraying vector of a first nozzle of a first nozzle unit of every pair of adjacent nozzle units crosses a spraying vector of a second nozzle of a second nozzle unit of the respective pair of adjacent nozzle units at a point above the target area. When the boom is at a predetermined operation height, each location within a target area receives a predefined cumulative volume of treatment. At least 10 percent of a spray pattern of the first nozzle of the first nozzle unit overlaps at least 10 percent of a spray pattern of the second nozzle of the second nozzle unit, such that, when the boom is within 5% deviation from the predetermined operation height, each location within the target area receives a predefined minimum percentage of the predefined cumulative volume of the treatment.

Advantageously, splitting the coverage of each target area between two nozzles enables targeted application of treatment, so that areas outside of the target area do not receive treatment. The use of overlap ensures that the correct volume of treatment is applied when the boom is at the predetermined operation height, and simultaneously ensures that the actual delivered volume is not reduced below a predefined minimum percentage when the boom is lowered.

In another implementation according to the first aspect, each nozzle is an off-center flat fan nozzle configured to emit a spray pattern having an approximate cross section of a right triangle along the horizontal axis. The use of off-center nozzles limits application of treatment to areas underneath and between a first nozzle of a first nozzle unit and a second nozzle of an adjacent second nozzle unit, and excludes areas of the field that are outside the target area.

In another implementation according to the first aspect, each nozzle applies a uniform flow across an entire width of its spray pattern across the horizontal axis. Nozzles applying uniform flow are convenient to implement. Furthermore, each nozzle applies the same amount of treatment at every location within its spray pattern.

In another implementation according to the first aspect, when the boom is at the predetermined operation height, each location within the target area receives half of the predetermined cumulative volume of treatment from the first nozzle of the first nozzle unit and half of the predetermined cumulative volume of treatment from the second nozzle of the second nozzle unit. Dividing the predetermined cumulative volume evenly between the two nozzles enables use of conventional nozzles with even spray patterns.

In another implementation according to the first aspect, each nozzle applies a greater flow closer to the nozzle along the horizontal axis and a lesser flow further from the nozzle along the horizontal axis. Advantageously, having a lesser flow further from the nozzle minimizes the effect of lowering the boom on the cumulative volume of treatment. This is because, even if a location receives less treatment from a particular nozzle, the location still receives a greater amount of treatment from the other nozzle.

Optionally, each nozzle has a spray pattern divided into at least three regions arranged in a sequence of flow volumes. A region in an area closest to the nozzle along the horizontal axis has a highest flow volume and an area furthest from the nozzle along the horizontal axis has a lowest flow volume. The use of three flow regions ensures that, excluding the most extreme cases of boom lowering, the spray patterns overlap with a total minimum value exceeding half of the predetermined cumulative volume.

Optionally, for every two nozzles with overlapping spray patterns, an area with greater flow from a first nozzle and an area with lesser flow from a second nozzle overlap, so that each location with the target area receives a uniform amount of treatment. Advantageously, the system provides uniform treatment when the boom is at the operation height, while ensuring application of a high percentage of the predetermined minimum treatment when the boom is lowered.

In another implementation according to the first aspect, the intervals are spaced and the nozzles are configured such that when the boom is lowered to 5% below the predetermined operation height, each location within the target area receives spray from at least one of the first nozzle from the first nozzle unit and the second nozzle from the second nozzle unit, totaling at least half of the predetermined cumulative volume. Optionally, each location within the target area receives spray totaling at least 60% of the predetermined cumulative volume. The percentage may be further increased, depending on the different percentages of the predetermined cumulative volume that are emitted from each region of each nozzle.

In another implementation according to the first aspect, the system further includes at least one solenoid valve connected to each nozzle unit. A controller is configured to control opening and closing of the solenoid valves so as to direct the predefined cumulative volume selectively onto each target area. By operation of the controller, each nozzle unit sprays treatment only when required.

Optionally, a separate solenoid valve controls each of the nozzles of each nozzle unit. Advantageously, the separate solenoid valve allows for separate control of each nozzle.

Optionally, when a target area is between two adjacent nozzle units, the controller is configured to open the first nozzle from a first nozzle unit and the second nozzle from a second nozzle unit, so as to spray overlapping sprays over the target area. Advantageously, the controller opens only those nozzles that are required to overlap the sprays on the target area.

Optionally, when a target area is within a spray pattern of three adjacent nozzle units, the controller is configured to open the first nozzle from a first nozzle unit, the second nozzle from a second nozzle unit, and both the third and second nozzles from a third nozzle unit in between the first and second nozzle units, so as to spray overlapping sprays over the target area. Advantageously, the system may thus be used to spray target areas that are wider than the distance between two adjacent nozzle units.

In another implementation according to the first aspect, the system further comprises at least one sensor unit including one or more of an image sensor, an optical sensor, a fluorescence sensor, an infrared sensor, a LIDAR sensor, an NDVI sensor, an RGB sensor, or a three-dimensional sensor. The controller is configured to identify the target areas based on information collected by the at least one sensor unit. The system for delivering treatment may thus be integrated with sensors used for identifying target areas for spraying, increasing overall efficiency.

In another implementation according to the first aspect, the one or more target areas comprises one or more rows of crops for band spraying. The system may be applied onto any target area having a defined dimension, such as in band spraying in which the width of the band is defined.

According to a second aspect, a method of spot spraying or band spraying a treatment onto one or more target areas of an agricultural field is disclosed. The method is performed with a system comprising at least one liquid conducting member, and a plurality of nozzle units connected to the at least one liquid conducting member and spaced at intervals extending on a horizontal axis. Each nozzle unit includes at least first and second nozzles configured to spray droplets around opposing spraying vectors along the horizontal axis. When the at least one liquid conducting member and the plurality of nozzle units are attached to a boom, and for each target area between adjacent nozzle units, a spraying vector of a first nozzle of a first nozzle unit of every pair of adjacent nozzle units crosses a spraying vector of a second nozzle of a second nozzle unit of the respective pair of adjacent nozzle units at a point above the target area. When the boom is at a predetermined operation height, each location within a target area receives a predefined cumulative volume of treatment, and at least 10 percent of a spray pattern of the first nozzle of the first nozzle unit overlaps at least 10 percent of a spray pattern of the second nozzle of the second nozzle unit, such that, when the boom is within 5% deviation from the predetermined operation height, each location within the target areas receives a predefined minimum percentage of the predefined cumulative volume of treatment. At least one solenoid valve is connected to each nozzle unit. The method includes: identifying at least one target area for application of treatment; determining the predefined cumulative volume of treatment to apply onto each location within the target area, and controlling the solenoid valves so as to direct an overlapping spray from adjacent nozzle units onto each target area, such that each location within the target area receives the predefined cumulative volume of treatment.

Advantageously, splitting the coverage of each target area between two nozzles enables targeted application of treatment, so that areas outside of the target area do not receive treatment. The use of overlap ensures that the correct volume of treatment is applied when the boom is at the predetermined operation height, and simultaneously ensures that the actual delivered volume is not reduced below a predefined minimum percentage when the boom is lowered.

In another implementation according to the second aspect, the method further comprises controlling each of the nozzles of each nozzle unit with a separate solenoid valve. The separate solenoid valve allows for separate control of each nozzle.

In another implementation according to the second aspect, the method further comprises applying a uniform flow from each nozzle across an entire width of said nozzle's spray pattern along the horizontal axis. Nozzles applying uniform flow are convenient to implement. Furthermore, each nozzle applies the same amount of treatment at every location within its spray pattern.

In another implementation according to the second aspect, when the boom is at the predetermined operation height, the method further comprises applying onto each target area half of the predetermined cumulative volume of treatment from the first nozzle of the first nozzle unit and half of the predetermined cumulative volume of treatment from the second nozzle of the second nozzle unit. Dividing the predetermined cumulative volume evenly between the two nozzles enables use of conventional nozzles with even spray patterns.

In another implementation according to the second aspect, the method further comprises, for each nozzle, applying a greater flow closer to the nozzle along the horizontal axis and a lesser flow further from the nozzle along the horizontal axis. Advantageously, having a lesser flow further from the nozzle minimizes the effect of lowering the boom on the cumulative volume of treatment. This is because, even if a location receives less treatment from a particular nozzle, the location still receives a greater amount of treatment from the other nozzle.

Optionally, the method further comprises applying a flow from each nozzle in a sequence of flow volumes. Each nozzle has a spray pattern divided into at least three regions arranged in the sequence of flow volumes. A region in an area closest to the nozzle along the horizontal axis has a highest flow volume and an area furthest from the nozzle along the horizontal axis has a lowest flow volume. The use of three flow regions ensures that, excluding the most extreme cases of boom lowering, the spray patterns overlap with a total minimum value exceeding half of the predetermined cumulative volume.

Optionally, the method further comprises performing the applying step with the nozzles spaced such that for every two nozzles with overlapping spray patterns, an area with greater flow from a first nozzle and an area of lesser flow from a second nozzle overlap, so that each location within each respective target area receives a uniform amount of treatment. The differences in the regions of each respective spray pattern thus cancel each other out.

In another implementation according to the second aspect, the method further comprises identifying the one or more target areas based on information collected by at least one sensor unit, wherein the at least one sensor unit comprises one or more of an image sensor, an optical sensor, a fluorescence sensor, an infrared sensor, a LIDAR sensor, NDVI sensor, RGB sensor, or a three-dimensional sensor. The method for delivering treatment may thus be integrated into, and performed immediately after, a method for identifying target areas for spraying, increasing overall efficiency.

In another implementation according to the second aspect, the method further comprises selecting as the one or more target areas one or more rows of crops for band spraying. The method may be applied onto any target area having a defined dimension, such as in band spraying in which the width of the band is defined.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Some embodiments of the present disclosure are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the present disclosure may be practiced.

In the drawings:

FIGS. 7A-7C schematically illustrate the effect of overlap and partial overlap of nozzle spray patterns having a uniform distribution of flow volumes, according to embodiments of the present disclosure;

FIGS. 7D-7F schematically illustrate the effect of overlap and partial overlap of two nozzle spray patterns, wherein each nozzle spray pattern has two regions with different flow volumes, according to embodiments of the present disclosure;

FIGS. 7G-7I schematically illustrate the effect of overlap and partial overlap of two nozzle spray patterns, wherein each nozzle spray pattern has three regions with different flow volumes, according to embodiments of the present disclosure;

DETAILED DESCRIPTION

Figure 1:
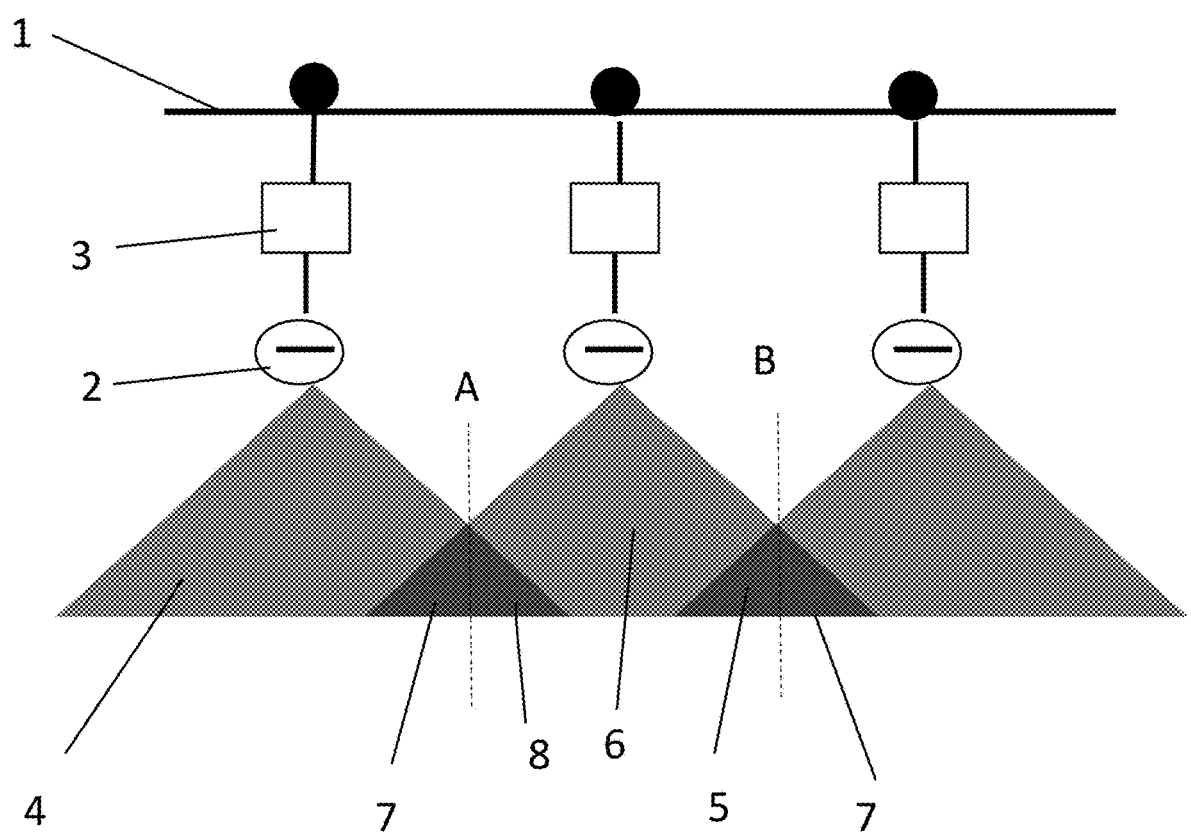
FIG. 1 is a schematic illustration of a prior art system for spot spraying.

The present invention, in some embodiments thereof, relates to agricultural treatment of plants, and more specifically, but not exclusively, to systems and methods for optimizing delivery of a predetermined volume of treatment onto one or more target areas when spot spraying or band spraying.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

As used in the present disclosure, the term "agricultural field" refers to any area of land on which plants are cultivated, including a crop field, an orchard, or a vineyard. The plants may be any type of cultivated plant, such as a grain, a vegetable, or a tree. In exemplary uses of the systems described herein, the agricultural field has grain or vegetable crops planted in rows.

As used in the present disclosure, the term "agricultural treatment" refers to any fluid that is sprayed on an agricultural field, for example, for the purpose of improving crop yield or controlling weed growth. The agricultural treatment may be, for example, water, an herbicide, a pesticide, a fungicide, an insecticide, a growth regulator, or a fertilizer.

As used in the present disclosure, the term "spot spraying" refers to a method of spraying in which target areas containing unwanted plant or weed growth are identified, and only those target areas are sprayed with an herbicide. The target areas may be identified with sensors, and demarcated with a virtual bounding region, such as a rectangular box, enclosing the identified unwanted plant or weed growth.

As used in the present disclosure, the term "band spraying" or "banded application" refers to a method of spraying an agricultural treatment over a width of one or more rows of crops, without spraying a surface area of the agricultural field that is between the rows of crops.

As used in the present disclosure, the term "selective spraying" is a general term that includes both spot spraying and band spraying.

As used in the present disclosure, the term "boom" refers to a horizontal rod or pipe with attached nozzles for distributing spray from a tank. The term "boom" may also be referred to as a "spray boom." A boom is carried over an agricultural field by an agricultural vehicle, such as a tractor, a drone, an airplane, or an off-road vehicle, and a motor connected to a boom.

As used in the present disclosure, the term "predetermined operation height" refers to a height at which a boom is designed to be carried when spraying agricultural treatment. Typically, a boom is operated at a height of around 0.5 to 1.5 meters. The specific operation height is selected to optimize coverage of agricultural treatment on a target area of the agricultural field. The height may be optimized based on various interrelated factors for controlling spraying coverage, such as the type of nozzle used, angle of the nozzles relative to vertical, horizontal distance of the nozzles along an axis of the boom, and pressure of the fluid when it is released from the nozzles.

In FIG. 1, a prior art system for selective spraying is disclosed. A plurality of nozzles 2 are arranged horizontally along a boom 1. Flow of an agricultural treatment through each nozzle 2 is controlled by a solenoid valve 3. When the boom 1 passes over a target area, a controller (not shown) opens one of the solenoid valves 3, so as to cause spray to emerge from nozzle 2 in a spray pattern 4. Spray pattern 4 is typically an even flat fan.

As is well known in the art, because spray booms are very large (e.g., about 10-50 meters, or larger), they are prone to variations in location along their lengths, i.e., the nozzles are not located at the same height and/or same angle along a straight line that moves along at a common speed for all nozzles. This variation leads to difficulty in obtaining a desired target spray pattern from multiple nozzles located along the length of the spray boom. In particular, the variation in height poses challenges in ensuring an even spray application of agricultural treatment. Even spraying is desirable because it helps to reduce the chemical doses applied to the agricultural field, while maintaining the required biological effect. Vertical ("sway") movements of the boom affect the deposit density both along and across the agricultural vehicle's tracks, due to the changing horizontal spread of the spray with changing of the height.

This variation in horizontal spread poses challenges in the context of spot spraying. This is because, in the system of spot spraying shown in FIG. 1, order to minimize the amount of treatment applied, only a single nozzle 2 is opened at once. As a result, it is necessary to configure the system so that this single nozzle 2 covers the entire desired target area, taking into account variations in deposit density resulting from sway movements of the boom 1.

In the system of FIG. 1, nozzles 2 are spaced so that, when the boom 1 is at a predetermined operation height, the spray patterns 4 have a significant overlap region 5. A typical overlap percentage, in terms of horizontal width of the overlap region 5, is 10-20% of each spray pattern 4. For example, every time a target is identified at reference numeral 6, the spot spraying system may delineate a region for spraying bounded by dashed lines A and B. However, in order to ensure that this entire region is sprayed, it is also necessary to spray areas 7, peripheral to lines A and B. Areas 7 are sprayed not because there is anything desirable (e.g., a weed) to spray in that area, but rather solely to provide a margin of error, such that when the boom 1 lowered and the spray pattern 4 spreads over a narrower horizontal extent, the entirety of the area bounding target 6 is still sprayed. This system thus results in significant waste, attenuating the benefits of spot spraying. Furthermore, reducing the width of the overlap region 5 leads to a risk that, in the event that the boom 1 is lowered too far, parts of the target area around target 6 will not receive any spray.

Figure 2:
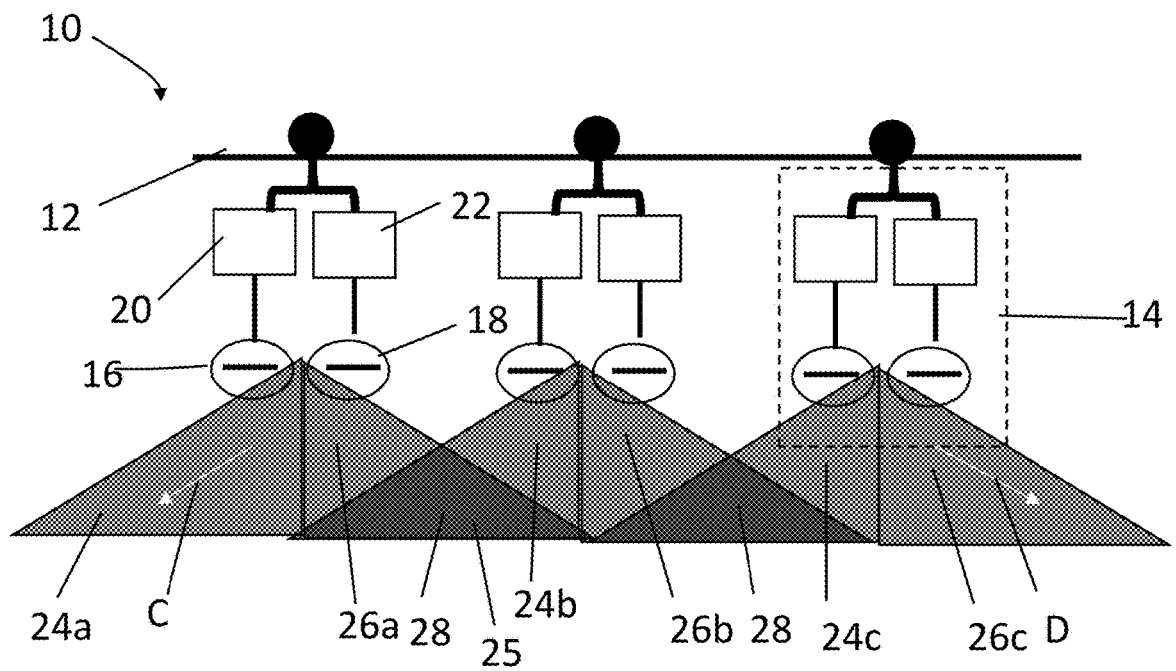
FIG. 2 is a schematic illustration of a system for selective spraying, showing multiple nozzle units arranged horizontally along a boom, according to embodiments of the present disclosure.
Figure 3:
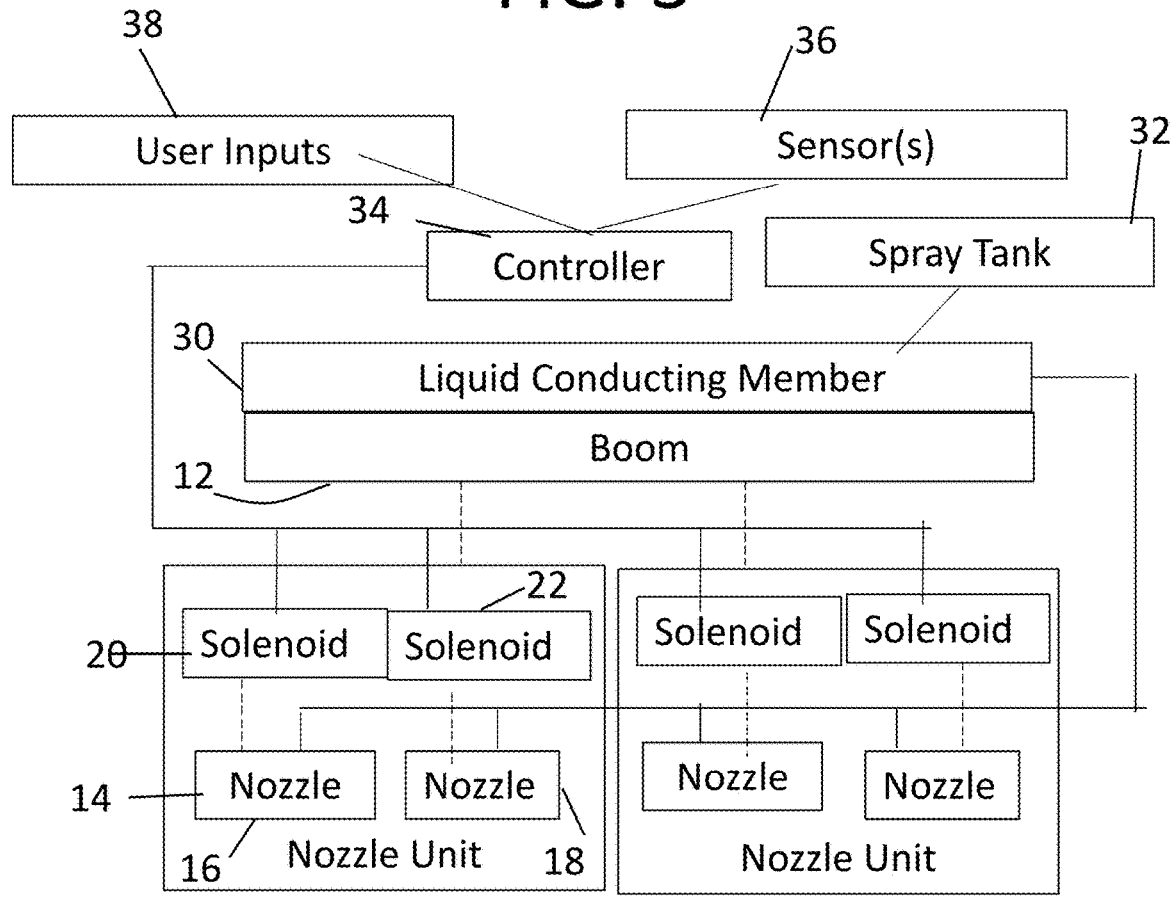
FIG. 3 is a schematic block diagram of the system for selective spraying of FIG. 2, according to embodiments of the present disclosure.
Figure 4:
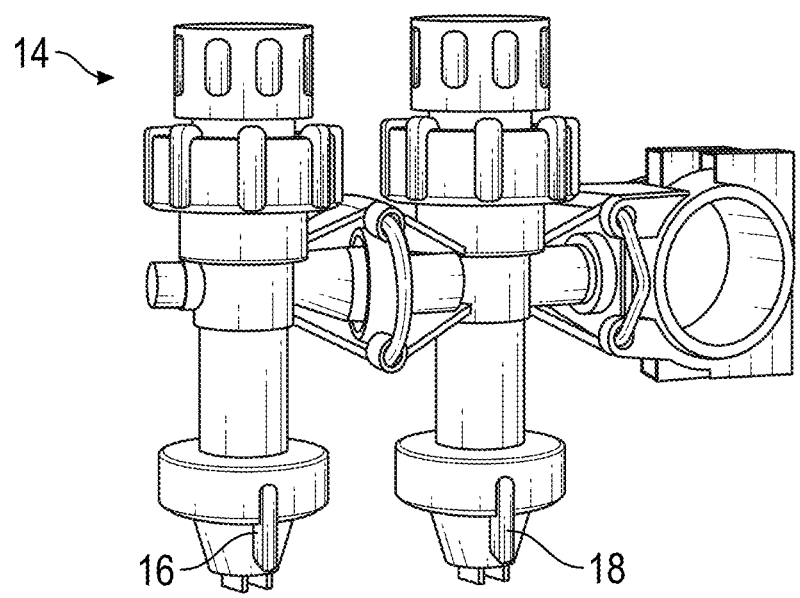
FIG. 4 is an illustration of a nozzle unit with a dual nozzle arrangement, according to embodiments of the present disclosure.
Figure 5A:
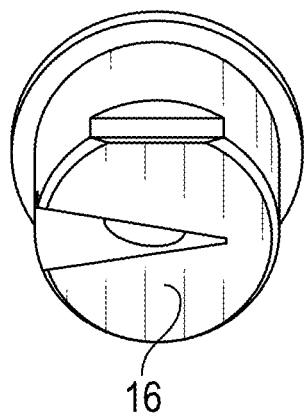
FIG. 5A is an image of an off-center flat fan nozzle, according to embodiments of the present disclosure.
Figure 5B:
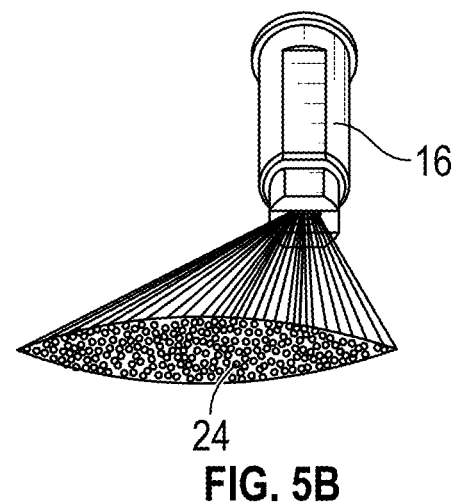
FIG. 5B is an illustration of a spray pattern of the off-center flat fan nozzle of FIG. 5A, according to embodiments of the present disclosure.
Figure 6A:
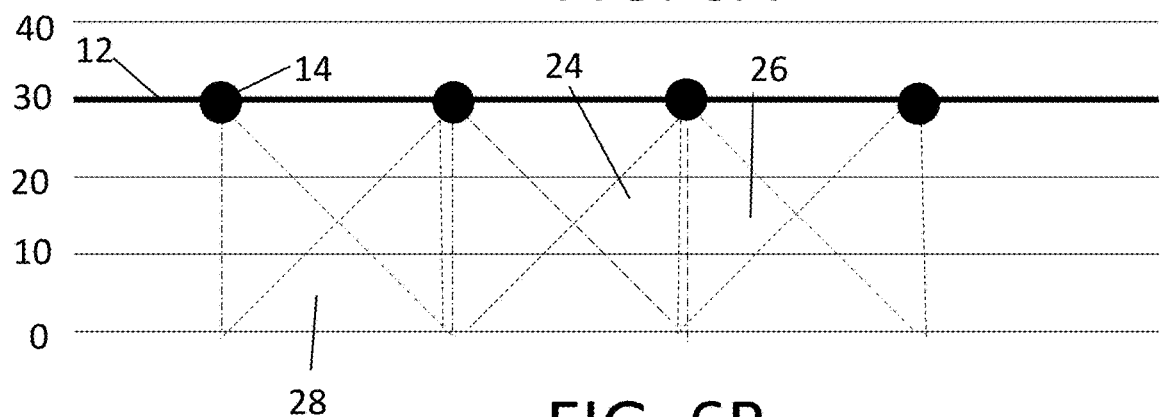
FIGS. 6A-6C schematically illustrate the effect of raising or lowering the boom on the overlap of spray patterns of adjacent nozzles, according to embodiments of the present disclosure.
Figure 6B:
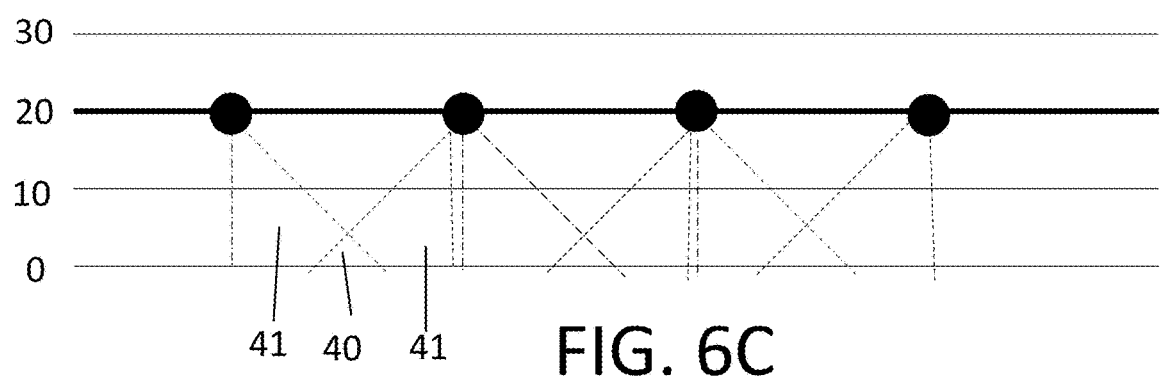
Figure 6C:
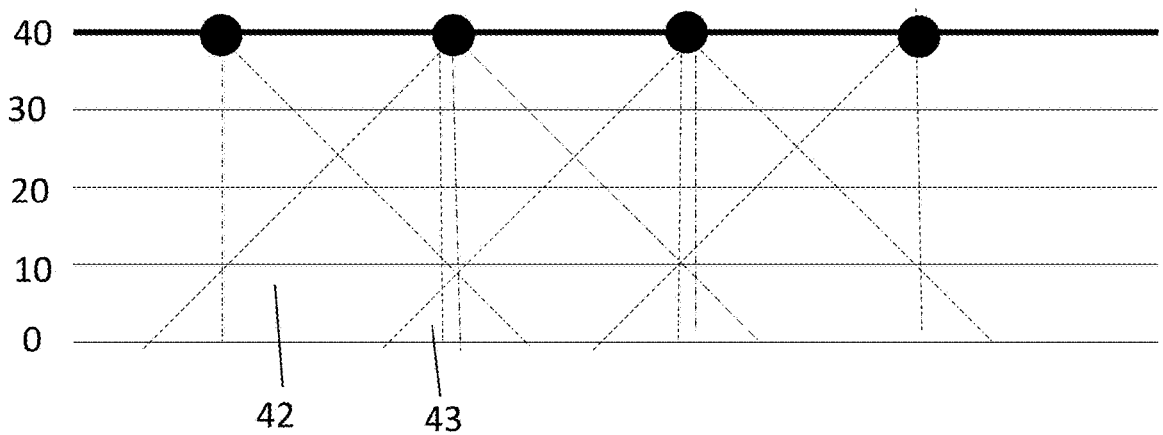

FIG. 2 depicts a schematic arrangement of a system 10 of nozzle units 14 arranged horizontally on a boom 12, according to embodiments of the present disclosure. FIG. 3 depicts a schematic block diagram of the fluidic, mechanical, and electrical components of the system 10 of FIG. 2. FIG. 4 depicts an example of a nozzle unit 14, according to embodiments of the present disclosure. FIG. 5A depicts an example of an off-center flat fan nozzle 16, and FIG. 5B depicts an example of a spray pattern 24 from an off-center flat fan nozzle, according to embodiments of the present disclosure.

Referring specifically to FIGS. 2 and 3 together, system 10 includes a liquid conducting member 30 connected to spray tank 32. Spray tank 32 contains a reservoir of a liquid agricultural treatment. The liquid conducting member 30 is attached to a boom 12.

A plurality of nozzle units 14 are connected to the liquid conducting member 30 and spaced at intervals extending on a horizontal axis. Each nozzle unit 14 includes a first nozzle 16 and a second nozzle 18. An example of such a nozzle unit 14 with multiple nozzles 16, 18 is depicted in FIG. 4. For purposes of convention, for each nozzle unit 14, the first nozzle 16 is depicted on the left, and the second nozzle 18 is depicted on the right. Each nozzle 16 is configured to spray droplets of agricultural treatment in a spray pattern 24 centered around vector C, and each nozzle 18 is configured to spray droplets of agricultural treatment in a spray pattern 26 centered around vector D. Vectors C and D point in substantially opposite directions relative to the horizontal axis of boom 12.

Optionally, each nozzle 16, 18, is an off-center flat-fan nozzle configured to emit a spray pattern 24, 26 having an approximate cross-section of a right triangle along the horizontal axis, as depicted in FIG. 2. An example of an off-center flat fan nozzle is depicted in FIG. 5A, and an example of a spray pattern 24 emitted from nozzle 16 is depicted in FIG. 5B.

As shown in FIG. 2, when the boom 12 is at the predetermined operation height, spray patterns of adjacent nozzles from different nozzle units 14 overlap. For every two adjacent nozzle units 14, the spray pattern 24 of the first nozzle 16 of the first nozzle unit overlaps the spray pattern 26 of the second nozzle 18 of the second nozzle unit, to form overlap region 28. For example, spray pattern 24b from the first nozzle 16 of the middle nozzle unit 14 overlaps with spray pattern 26a from the second nozzle 18 of the left nozzle unit 14. Likewise, spray pattern 24c from the first nozzle 16 of the right nozzle unit 14 overlaps with spray pattern 26b from the second nozzle 18 of the middle nozzle unit 14. In each example of overlapping spray patterns 24, 26, the vectors C and D cross each other at some point above the overlap region 28.

In the orientation of FIG. 2, the boom 12 at the predetermined operation height, and the degree of overlap is substantially 100%, such that the overlapping spray patterns cover the same horizontal extent. The degree of overlap may also be less than 100%. In exemplary embodiments, the degree of overlap at the predetermined operation height is at least 10% of the horizontal extent of each spray pattern 24, 26.

Each nozzle unit 14 is controlled by at least one solenoid valve. In the depicted embodiment, each nozzle 16 is controlled by a solenoid valve 20, and each nozzle 18 is controlled by a solenoid valve 22. Thus, within each sensor unit 14, it is possible to control separately the opening of nozzle 16 and nozzle 18. The solenoid valves 20, 22 are each connected to a controller 34, which may be programmed to selectively open each of the nozzles 16, 18, in order to selectively spray treatment on one or more target areas 25.

To identify target areas 25, controller 34 receives inputs from one or more sensor units 36. Sensor units 36 may be attached to the same agricultural vehicle as the boom 12, or to a different agricultural vehicle. These sensor units 36 are directed toward the agricultural field in order to detect the presence of weeds or other targets. For example, an image sensor may be used to capture an RGB image of the agricultural field, and the controller 34 contains processing circuitry capable of interpreting the captured image to detect the presence of a particular plant. In another example, the sensor unit 36 directs infrared radiation at the agricultural field, and detects near infrared light reflected back off of chlorophyll in the weeds. The sensor units 36 may additionally or alternatively include other sensing systems, such as, for example, an image sensor, an optical sensor, a fluorescence sensor, an infrared sensor, a LIDAR sensor, an NDVI sensor, an RGB sensor, or a three-dimensional sensor, each working in its typical manner. Upon receiving information from the sensor units 36 indicating the presence of a weed, the controller 34 may define a target area centered at the weed. In exemplary embodiments, the target area is rectangular.

While the examples described above refer to spot spraying of herbicides on identified weeds, the system 10 disclosed herein is usable for identifying and spraying other types of targets. For example, the sensor units 36 may identify a diseased crop (for example, diseased with a fungus, bacteria, or a virus), the presence of insects on a crop, or a failure of a crop to thrive (for example, due to lack of water or other nutrients). Depending on the identified condition, the system 10 may be configured to spray a suitable treatment.

Controller 34 also receives inputs from user inputs 38. The user inputs 38 may provide information about the system 10 and the desired uses thereof. For example, the user inputs may include angles of vectors C and D relative to the horizontal, or the intended speed of the agricultural vehicle during spraying. The user inputs may also include baseline information regarding the agricultural treatment, such as the identity of an herbicide that is used, and the amount of treatment that is generally required for each type of weed or crop. This baseline information may be used to calculate the predetermined minimum volume of treatment required for each location in the target area. Certain of this information may also be stored on a memory associated with the controller 34. In particular, the controller 34 may include a classifier (e.g., a neural network) that is able to identify a type of weed and/or a condition of a crop based on the contents of an image received from the sensor units.

Controller 34 may include processing circuitry. The processing circuitry may include a computer readable storage medium (or media) having computer readable program instructions thereon for causing a processor to carry out aspects of the present invention. The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the processing circuitry, partly on the processing circuitry, as a stand-alone software package, partly on the processing circuitry and partly on a remote computer or entirely on the remote computer or server. In the latter scenario, the remote computer may be connected to the processing circuitry through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In operation of system 10, the controller 34 identifies at least one target area 25 for application of treatment. As discussed above, the controller may identify the target area 25 based on information collected by the sensor units 36. In addition or alternatively, the target area 25 may be identified based on user inputs 38. For example, the target area 25 may be a row of crops for band spraying, and the user inputs the location and width of each band for spraying.

The controller 34 then determines a cumulative volume of treatment to apply onto each target area 25. The cumulative volume may be set by a user or calculated by the controller 34, in order to meet requirements of density and biological effectiveness, as discussed above. The controller 34 then controls the solenoid valves 20, 22, so as to direct an overlapping spray from adjacent nozzle units 14 onto each target area 25. In the example depicted in FIG. 2, target area 25 has the same horizontal extent as overlap region 28. Thus, the controller 34 directs the solenoid valves 20, 22, so that a first nozzle 16 from a first nozzle unit 14 and a second nozzle 18 from a second nozzle unit 14 are opened simultaneously. The overlapping spray patterns 24, 26 are sprayed around vectors C, D that overlap over the target area 25, and direct a predefined cumulative volume of treatment onto each location within the target area 25. In addition, the spray patterns 24, 26 are arranged such that when the boom is lowered by 5% from the predetermined operation height, each location within the target area 25 receives a predetermined percentage of the predetermined minimum volume of treatment. This predetermined minimum volume is, for example, at least 50%, and, in certain embodiments, is even 75% or higher, as will be discussed further herein.

Advantageously, when the boom 12 is at the predetermined operation height, each location receives exactly 100% of the required treatment, with no treatment being sprayed outside of the target area 25. This efficiency is achieved due to the use of overlapping sprays from adjacent nozzle units 14, wherein each spray pattern 24, 26 is arranged around opposing spraying vectors, as opposed to directing all of the spray from a single nozzle unit 14. Furthermore, due to the overlap of the spray patterns 24, 26, there is no practical scenario in which, as a result of the lowering of the boom, a given location within the target area 25 receives no treatment. In practice each location receives no less than 50% of the predetermined cumulative volume.

In the above-described implementation, the target area 25 is approximately the same width as the horizontal distance between two adjacent nozzle units 14, and thus is sprayed with a combination of sprays from only two nozzle units. In an implementation in which the target area 25 is wider than a horizontal distance between two adjacent nozzle units 14, the controller 34 may open nozzles from additional nozzle units. For example, referring again to FIG. 2, the controller 32 may open nozzles from three adjacent nozzle units 14, including the first nozzle 16 from the rightmost nozzle unit 14, the second nozzle 18 from the leftmost nozzle unit 14, and both nozzles 16, 18 from the middle nozzle unit 14. As a result, an area that is twice the horizontal extent of each overlap region 28 receives treatment. Even larger combinations of nozzle units 14 are also possible, depending on the size of the target area 25 and the distance between nozzle units 14.

FIGS. 6A-6C depict the effect of raising or lowering the boom on the overlap of spray patterns during use of system 10. The borders of spray patterns from each nozzle are shown at different arbitrary heights on a y-axis. Borders of spray patterns 24 are shown in dashed lines, and borders of spray patterns 26 are shown in dot-dash lines. The differences in boom height are shown in exaggerated dimensions, for clarity.

FIG. 6A depicts the boom 12 at the predetermined operation height, which is indicated with height 30 on the y-axis. As in FIG. 2, the overlap region 28 covers approximately the same horizontal distance as the distance between adjacent nozzle units 14. As a result, the entire distance between adjacent nozzle units 14 receives overlapping spray.

In FIG. 6B, the boom is lowered to height 20 on the y-axis. Because the angles of the nozzles are not changed, but the vertical distance traveled by the sprays is shorter, the horizontal extent of the spray patterns 24, 26 is lessened. As a result, an overlap region 40 forms only in the center of the distance between adjacent nozzle units 14. Peripheral regions 41 do not have overlap, and they accordingly receive treatment only from the nozzle units 14 that are closest to them.

In FIG. 6C, the boom is raised to height 40 on the y-axis. Because the angles of the nozzles are not changed, but the vertical distance traveled by the sprays is greater, the horizontal extent of each of the spray patterns is increased. As a result, a super-overlap region 43 forms, centered underneath each nozzle unit 14, which receives overlapping sprays from three different nozzle units. Region 42 receives overlapping sprays from two different nozzle units, similar to region 28 and region 40.

FIGS. 7A-71 apply the patterns shown in FIGS. 6A-6C, and in particular depict the effect of lowering the boom height when each nozzle has spray patterns with differential flow volumes.

FIGS. 7A-7C depict an arrangement in which each nozzle applies a uniform flow across an entire width of its spray pattern 44, 46. As shown in FIG. 7A, each nozzle is configured to spray 50% of the predetermined cumulative volume onto each location in the target area. In FIG. 7B, the spray patterns are completely overlapped, so that each location receives 100% of the predetermined cumulative volume. Specifically, each location within the target area receives half of the predetermined cumulative volume of treatment from the first nozzle of the first nozzle unit and half of the predetermined cumulative volume of treatment from the second nozzle of the second nozzle unit. In FIG. 7C, the boom is lowered, and as a result the spray patterns are only partially overlapped, in the manner previously shown in FIG. 6B. The overlap region is reduced to area 48, which continues to receive 100% of the predetermined cumulative volume. Peripheral regions 49 do not receive overlapping spray, but rather receive treatment only from one of the nozzles. As a result, peripheral regions 49 receive only 50% of the predetermined cumulative volume. The spray patterns of FIG. 7C are proportional to those of FIGS. 7A and 7B, but are shorter, to reflect the lowering of the spray boom.

In FIG. 7D, each nozzle applies a greater flow closer to the nozzle along the horizontal axis and a lesser flow further from the nozzle along the horizontal axis. When the boom is at the predefined operation height, the area with a greater flow from a first nozzle and an area with lesser flow from a second nozzle overlap, so that each location within the target area receives a uniform amount of treatment. In the example of FIG. 7D, each nozzle forms a spray pattern 54 or 56 in which 67% of the predefined cumulative volume is sprayed from a region closer to the nozzle, and 33% of the predefined cumulative volume is sprayed from a region further from the nozzle. As shown in FIG. 7E, the two spray patterns 54, 56 overlap to form overlap region 58, in which each location within the target area receives 100% of the predefined cumulative volume. That is, the region of greater flow from the first nozzle overlaps the region of lesser flow from the second nozzle, and vice versa. In FIG. 7F, the boom is lowered, and as a result the spray patterns are only partially overlapped, in the manner previously shown in FIG. 7C. Specifically, the areas with 33% of the volume no longer overlap the areas with 67% of the volume. However, the areas with 33% of the volume do overlap each other. As a result, a minimum of 66% of the predetermined cumulative volume is applied onto all locations within the target area.

In FIG. 7G, each spray pattern 56, 58 is divided into three regions arranged in a sequence of flow volumes. A region in an area closest the nozzle along the horizontal axis has a highest flow volume and an area furthest from the nozzle along the horizontal axis has the lowest flow volume. Specifically, the area closest to the nozzle has a flow volume of 75% of the predetermined cumulative volume, the next further region has a flow volume of 50% of the predetermined cumulative volume, and the furthest region has a flow volume of 25% of the predetermined cumulative volume. In FIG. 7H, the two spray patterns overlap at the predetermined operation height, such that each location within the target area receives 100% of the predefined cumulative volume, with regions of high volume offsetting regions of low volume, as in FIG. 7E. That is, regions with 25% volume overlap with regions of 75% volume, and regions of 50% volume overlap each other. In FIG. 7I, the boom is lowered, and as a result the spray patterns are only partially overlapped, in the manner previously shown in FIG. 7F. Specifically, the areas with 25% of the volume no longer overlap the areas with 75% of the volume. However, the areas with 25% of the volume do overlap the regions with 50% of the volume. As a result, a minimum of 75% of the predetermined cumulative volume is applied onto all locations within the target area. While it is theoretically possible that the boom may be lowered even further, causing overlap of only the two regions with 25% volume, the nozzle distances and angles may be arranged to ensure that this will not occur under normal operating conditions.

As may be recognized by those of skill in the art, it is likewise to apply the same principles onto nozzles with even more than three flow regions. In general, for a nozzle with n flow regions, it is possible to achieve a uniform flow, when the and the spray patterns completely overlap, by setting the highest flow volume as $n/(n+1)$, the next lowest flow volume at $(n-1)/(n+1)$, the next lowest flow volume at $(n-2)/(n+1)$, all the way down to the lowest flow volume of $1/(n+1)$. As a result of the overlap, each location in the target area receives the equivalent of $(n+1)/(n+1)$, or 100%, of the cumulative flow volume. In the event that the boom is lowered so that the overlap regions shift, the minimum percentage of the cumulative volume that is applied onto each location in the target area is $n/(n+1)$.

Figure 8A:
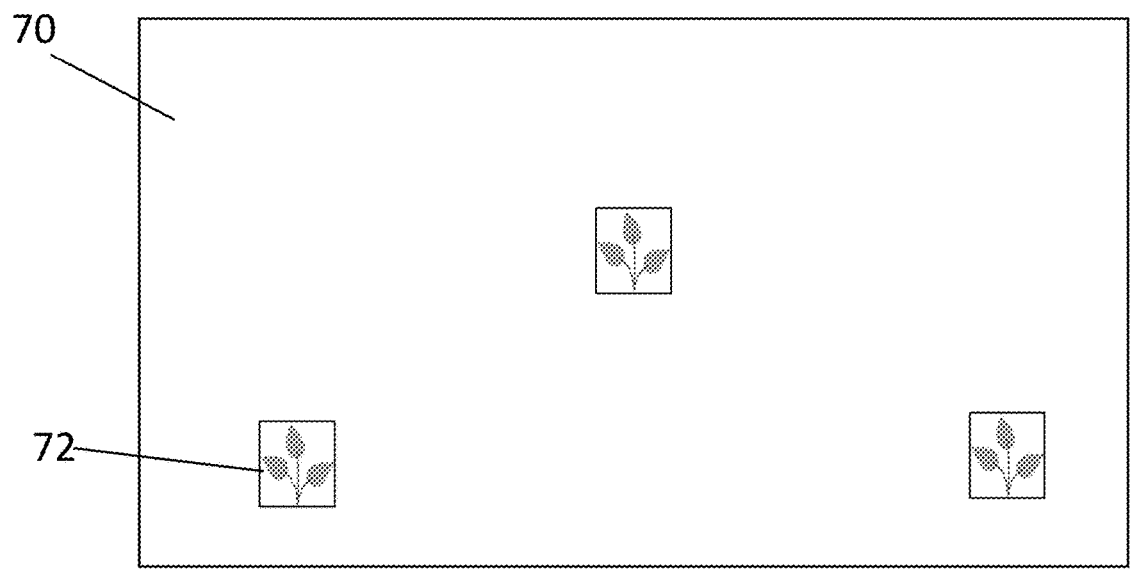
FIG. 8A schematically illustrates an agricultural field with identified target areas for spot spraying, according to embodiments of the present disclosure.
Figure 8B:
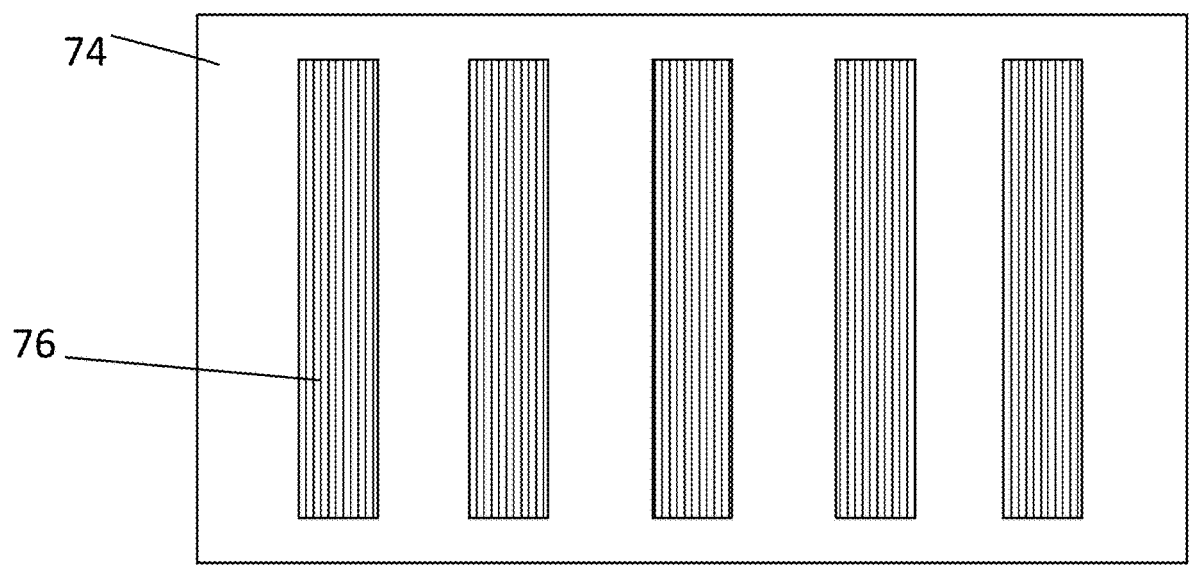
FIG. 8B schematically illustrates an agricultural field with identified rows of crops for band spraying, according to embodiments of the present disclosure.

FIGS. 8A and 8B depict different examples of agricultural fields on which spraying system 10 may be employed. In FIG. 8A, agricultural field 70 is depicted with target areas 72 drawn around weeds. As discussed above, the target areas 72 are identified based on detection of the weeds by one or more sensors.

In FIG. 8B, agricultural field 74 is depicted with crop rows 76. The crop rows 76 are the target areas for spraying. Information about the crop rows 76, for example, the width of the crop rows 76 and the type of crops that are being grown, may be input manually by a user or also detected by one or more sensors.

It is expected that during the life of a patent maturing from this application many relevant booms, sensors, and nozzles will be developed that are suitable for the functions described herein, and the scope of the terms boom, sensor, and nozzle is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system adapted for spot spraying or band spraying of a treatment applied to one or more target areas of an agricultural field, comprising:
   at least one liquid conducting member;
   a plurality of nozzle units connected to the at least one liquid conducting member and spaced at intervals extending on a horizontal axis, each nozzle unit comprising at least first and second nozzles configured to spray droplets around opposing spraying vectors along the horizontal axis;
   wherein when the at least one liquid conducting member and plurality of nozzle units are attached to a boom, and for each of the one or more target areas between adjacent nozzle units:
   a spraying vector of a first nozzle of a first nozzle unit of every pair of adjacent nozzle units crosses a spraying vector of a second nozzle of a second nozzle unit of the respective pair of adjacent nozzle units at a point above a respective target area;
   when the boom is at a predetermined operation height, each location within the respective target area receives a predefined cumulative volume of treatment, and
   at least 10 percent of a spray pattern of the first nozzle of the first nozzle unit overlaps at least 10 percent of a spray pattern of the second nozzle of the second nozzle unit, such that, when the boom is within 5% deviation from the predetermined operation height, each location within the respective target area receives a predefined minimum percentage of the predefined cumulative volume of the treatment.

2. The system of claim 1, wherein each nozzle is an off-center flat fan nozzle configured to emit a spray pattern having an approximate cross-section of a right triangle along the horizontal axis.

3. The system of claim 1, wherein each nozzle applies a uniform flow across an entire width of its spray pattern along the horizontal axis.

4. The system of claim 1, wherein, when the boom is at the predetermined operation height, each location within the respective target area receives half of the predetermined cumulative volume of treatment from the first nozzle of the first nozzle unit and half of the predetermined cumulative volume of treatment from the second nozzle of the second nozzle unit.

5. The system of claim 1, wherein each nozzle applies a greater flow closer to the nozzle along the horizontal axis and a lesser flow further from the nozzle along the horizontal axis.

6. The system of claim 5, wherein each nozzle has a spray pattern divided into at least three regions arranged in a sequence of flow volumes, wherein a region in an area closest to the nozzle along the horizontal axis has a highest flow volume and an area furthest from the nozzle along the horizontal axis has a lowest flow volume.

7. The system of claim 5, wherein, for every two nozzles with overlapping spray patterns, an area with greater flow from a first nozzle and an area with lesser flow from a second nozzle overlap, so that each location within the respective target area receives a uniform amount of treatment.

8. The system of claim 1, wherein the intervals are spaced and nozzles are configured such that when the boom is lowered to 5% below the predetermined operation height, each location within the respective target area receives spray from at least one of the first nozzle from the first nozzle unit and the second nozzle from the second nozzle unit, totaling at least half of the predetermined cumulative volume.

9. The system of claim 8, wherein when the boom is lowered to 5% below the predetermined operation height, each location within the respective target area receives spray totaling at least 60% of the predetermined cumulative volume.

10. The system of claim 1, further comprising at least one solenoid valve connected to each nozzle unit, and a controller configured to control opening and closing of the solenoid valves so as to direct the predefined cumulative volume selectively onto each of the one or more target areas.

11. The system of claim 10, further comprising a separate solenoid valve for controlling each of the nozzles of each nozzle unit.

12. The system of claim 11, wherein, when the respective target area is between two adjacent nozzle units, the controller is configured to open the first nozzle from a first nozzle unit and the second nozzle from a second nozzle unit, so as to spray overlapping sprays over the respective target area.

13. The system of claim 11, wherein when the respective target area is within a spray pattern of three adjacent nozzle units, the controller is configured to open the first nozzle from a first nozzle unit, the second nozzle from a second nozzle unit, and both the first and second nozzles from a third nozzle unit in between the first and second nozzle units, so as to spray overlapping sprays over the respective target area.

14. The system of claim 1, further comprising at least one sensor unit comprising one or more of an image sensor, an optical sensor, a fluorescence sensor, an infrared sensor, a LIDAR sensor, an NDVI sensor, an RGB sensor, or a three-dimensional sensor, wherein the controller is configured to identify the one or more target areas based on information collected by the at least one sensor unit.

15. The system of claim 1, wherein the one or more target areas comprises one or more rows of crops for band spraying.

16. A method of spot spraying or band spraying a treatment onto one or more target areas of an agricultural field, wherein the method is performed with a system comprising at least one liquid conducting member, and a plurality of nozzle units connected to the at least one liquid conducting member and spaced at intervals extending on a horizontal axis, each nozzle unit comprising at least first and second nozzles configured to spray droplets around opposing spraying vectors along the horizontal axis, wherein when the at least one liquid conducting member and the plurality of nozzle units are attached to a boom, and for each of the one or more target areas between adjacent nozzle units, a spraying vector of a first nozzle of a first nozzle unit of every pair of adjacent nozzle units crosses a spraying vector of a second nozzle of a second nozzle unit of the respective pair of adjacent nozzle units at a point above a respective target area, when the boom is at a predetermined operation height, each location within the respective target area receives a predefined cumulative volume of treatment, and at least 10 percent of a spray pattern of the first nozzle of the first nozzle unit overlaps at least 10 percent of a spray pattern of the second nozzle of the second nozzle unit, such that, when the boom is within 5% deviation from the predetermined operation height, each location within the respective target area receives a predefined minimum percentage of the predefined cumulative volume of treatment, and at least one solenoid valve connected to each nozzle unit, the method comprising:
   identifying each of the one or more target areas for application of treatment;
   determining the predefined cumulative volume of treatment to apply onto each location within the respective target area; and
   controlling the at least one solenoid valve so as to direct an overlapping spray from adjacent nozzle units onto the respective target area, such that each location within the respective target area receives the predefined cumulative volume of treatment.

17. The method of claim 16, further comprising controlling each of the nozzles of each nozzle unit with a separate solenoid valve.

18. The method of claim 16, further comprising applying a uniform flow from each nozzle across an entire width of said nozzle's spray pattern along the horizontal axis.

19. The method of claim 16, further comprising, when the boom is at the predetermined operation height, applying onto the respective target area half of the predetermined cumulative volume of treatment from the first nozzle of the first nozzle unit and half of the predetermined cumulative volume of treatment from the second nozzle of the second nozzle unit.

20. The method of claim 16, further comprising, for each nozzle, applying a greater flow closer to the nozzle along the horizontal axis and a lesser flow further from the nozzle along the horizontal axis.

21. The method of claim 20, further comprising applying a flow from each nozzle in a sequence of flow volumes, wherein each nozzle has a spray pattern divided into at least three regions arranged in the sequence of flow volumes, wherein a region in an area closest to the nozzle along the horizontal axis has a highest flow volume and an area furthest from the nozzle along the horizontal axis has a lowest flow volume.

22. The method of claim 20, further comprising performing the applying step with the nozzles spaced such that for every two nozzles with overlapping spray patterns, an area with greater flow from a first nozzle and an area of lesser flow from a second nozzle overlap, so that each location within the respective target area receives a uniform amount of treatment.

23. The method of claim 16, further comprising identifying each of the one or more target areas based on information collected by at least one sensor unit, wherein the at least one sensor unit comprises one or more of an image sensor, an optical sensor, a fluorescence sensor, an infrared sensor, a LIDAR sensor, NDVI sensor, RGB sensor, or a three-dimensional sensor.

24. The method of claim 16, further comprising selecting as the one or more target areas one or more rows of crops for band spraying.

* * * * *